United States Patent [19]
Stephenson et al.

[11] Patent Number: 6,094,642
[45] Date of Patent: Jul. 25, 2000

[54] INTEGRATED DATA COLLECTION AND TRANSMISSION SYSTEM AND METHOD OF TRACKING PACKAGE DATA

[75] Inventors: Winn Stephenson, Memphis; Bruce Lindow; Tracy Bailey, both of Germantown; Terence Hollahan; David Mundie, both of Memphis, all of Tenn.

[73] Assignee: Federal Express Corporation, Memphis, Tenn.

[21] Appl. No.: 08/957,625

[22] Filed: Oct. 24, 1997

[51] Int. Cl.7 ....................................... G06F 17/60
[52] U.S. Cl. .................. 705/28; 235/385; 235/435; 235/462; 340/825.54
[58] Field of Search ......................... 235/385, 435, 235/449, 454, 462, 468, 472; 340/825.54; 705/28

[56] References Cited

U.S. PATENT DOCUMENTS

| | | |
|---|---|---|
| 5,671,362 | 9/1997 | Cowe et al. ............................. 705/28 |
| 5,726,984 | 3/1998 | Kubler et al. ........................... 370/349 |
| 5,790,536 | 8/1998 | Mahany et al. ......................... 370/338 |
| 5,844,400 | 12/1998 | Ramsier et al. ........................ 320/106 |

*Primary Examiner*—Edward R. Cosimano
*Attorney, Agent, or Firm*—Finnegan, Henderson, Farabow, Garrett & Dunner L.L.P.

[57] ABSTRACT

An integrated data collection and transmission system and method for collecting and transmitting data related to package delivery. The system and method utilize various components that are commonly connected via one or both of an infrared communications link and a microradio link.

43 Claims, 12 Drawing Sheets

INTEGRATED DATA COLLECTION AND TRANSMISSION SYSTEM AND METHOD OF TRACKING PACKAGE DATA

BACKGROUND OF THE INVENTION

The present invention relates generally to an integrated data collection and transmission system and method of tracking package data.

In recent years, overnight and other forms of package delivery have become embedded within our business culture. Customers demand increasingly quick delivery times and expect to receive up-to-the-minute information about the status of packages they deliver and expect to receive. In order to meet these needs and expectations, it is necessary for providers of package delivery services to continually innovate their services to provide their customers with the most up-to-date information about their shipments as possible.

Computerized parcel shipping systems are known in the prior art. One such system is disclosed in U.S. Pat. No. 4,839,813 issued to Hills et al. In accordance with the system disclosed in Hills et al., a user can track and record transactions of various different carriers and can store a file of records relating to the transactions. However, Hills et al. does not disclose an integrated data collection and transmission system but merely provides for the user to maintain files relative to shipments made with different carriers. Hills et al. also does not disclose an integrated system in which various of the components exchange information via a common communications link.

U.S. Pat. No. 5,313,051 issued to Brigida et al. discloses a paperless parcel tracking system. The system disclosed in Brigida et al. includes a parcel tracking system 100 that can include a bar code scanner and a touch panel display. The parcel tracking system also includes a host link to communicate with a host system. This communication can be accomplished via an infrared link, cellular or radio transmission, or conventional electrical contacts. Brigida et al. also shows that the parcel tracking system can be used with a docking station, which can function as a temporary host or function as an infrared I/O device attached to a host such as a personal computer. As shown, the parcel tracking system is docked in the docking station to enable communications between the devices.

The system disclosed in Brigida et al. is, however, limited because it does not provide an integrated data collection and transmission system wherein a data collection device is capable of communicating with one or more peripheral devices and with one or more intermediate data storage devices. In addition, Brigida et al. shows that the parcel tracking system is docked within the docking station in order for a transfer of information to occur between the devices. This reduces the flexibility of the system because the parcel tracking system and the docking station must be physically connected for the transmission of data between the devices to occur.

An object of the present invention is to provide an integrated data collection and transmission system and method of tracking packages wherein various elements of the system are interconnected by a common communications link such that components of the system need not be physically connected to enable the transfer of data therebetween.

It is a further object of the present invention to provide for automatic communication between various of the components of the integrated data collection and transmission system.

Another object of the present invention is to provide user actuated communication between various of the components of the integrated data collection and transmission system.

It is a still further object of the present invention to provide a data collection device capable of collecting and storing package data, communicating with at least one peripheral device, and transmitting the package data to an intermediate data storage device, which ultimately transmits the package data to a central storage location.

Another object of the present invention is to provide a data collection device capable of transmitting and receiving information relating to package delivery services, but that is not package tracking data.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

SUMMARY OF THE INVENTION

To achieve these and other advantages and in accordance with the purposes of the invention, as embodied and broadly described, the present invention includes an integrated data collection and transmission system for package tracking comprising a data collection terminal capable of collecting and storing package tracking data, the data collection terminal including one of an infrared communications port and a micro-radio, at least one peripheral device, associated with the data collection terminal, the peripheral device including one of an infrared communications port and a micro-radio for receiving at least one communication from the data collection terminal and for performing a preselected operation related to package tracking based on the at least one received communication, an intermediate data storage device, associated with the data collection terminal, the intermediate data storage device including one of an infrared communications port and a micro-radio for receiving the collected and stored package tracking data from the data collection terminal and a central data collection facility, capable of communicating with the intermediate data storage device, for receiving the collected and stored package tracking data from the intermediate data storage device and for maintaining an accessible package tracking database based on the collected and stored package tracking data.

The present invention also includes an integrated data collection and transmission system having one of a common infrared communications link and a microradio link between selected ones of its components comprising one or more bar code scanning devices, each having a memory, an informational display, a CPU, a keyboard for inputting information to the device, a power supply, and one of an infrared communications port and a microradio for communicating with selected other components of the system including other of the bar code scanners, one or more intermediate data storage and processing devices provided with one of an infrared communications port and a microradio for receiving information from one of the one or more bar code scanning devices and for communicating with the selected other components of the system, a printer with one of an infrared communications port and a microradio capable of receiving a print command from one of the one or more bar code scanning devices, and a central computer with means for accepting, storing and transmitting data to and between the one or more intermediate data storage and processing devices.

In accordance with the purposes of the invention, as embodied and broadly described, the invention also includes a method of tracking package data using an integrated data collection and transmission system, the method comprising the steps of using a bar code scanner to collect and store package tracking data, transmitting a communication to a peripheral device via one of an infrared communications and a micro-radio link, the peripheral device performing a preselected operation related to package tracking based on the command, transmitting the collected and stored package tracking data to an intermediate data storage device via one of the infrared communications and micro-radio links, transmitting the collected and stored package tracking data to a central data facility, and obtaining an accessible package tracking database based on the collected and stored package tracking data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention. In the Drawings.

DESCRIPTION OF THE PREFERRED EMBODIMENTS

Embodiments of the present invention will now be described with reference to the drawings.

Figure 1:
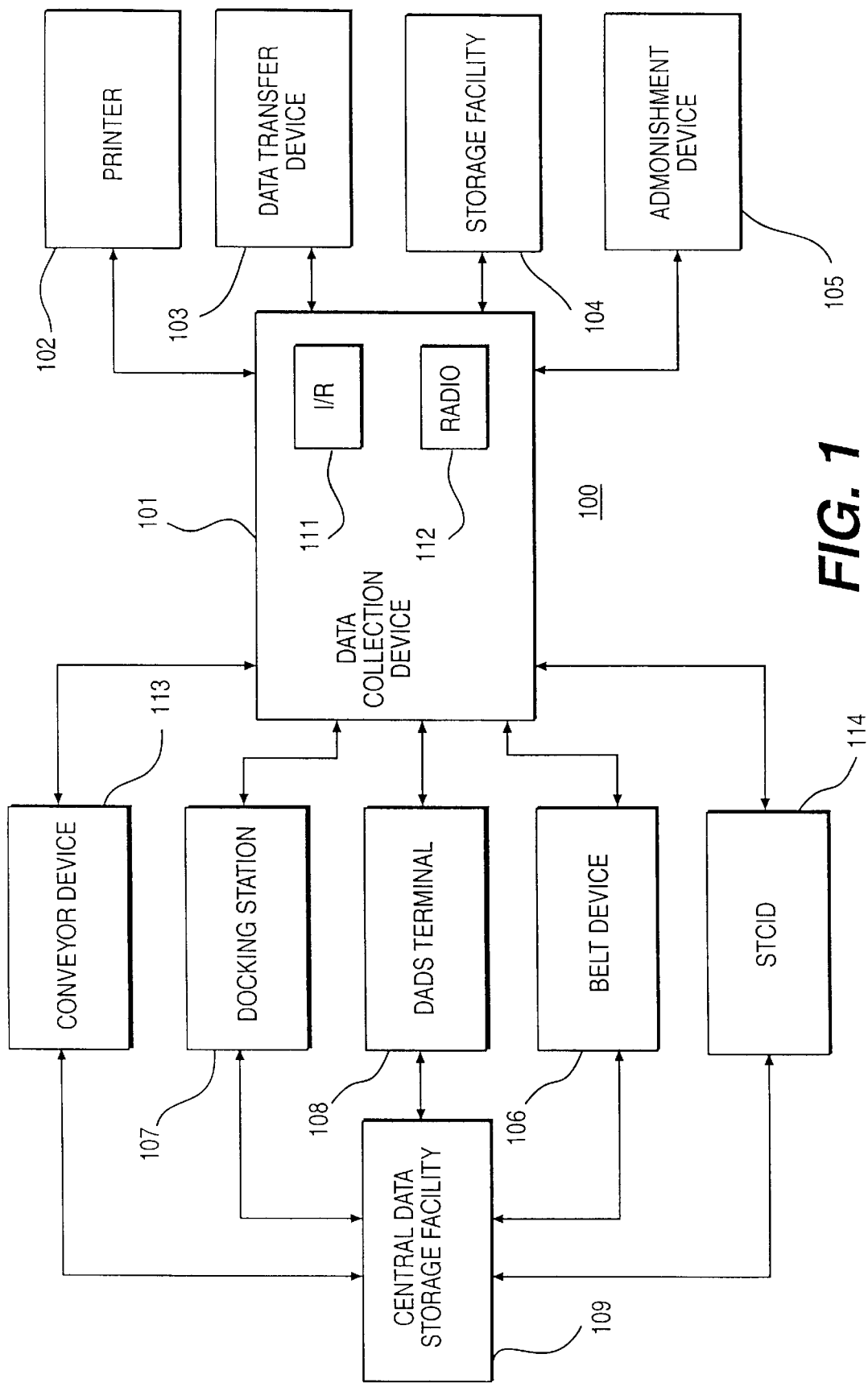
FIG. 1 is a block diagram of the integrated data collection and transmission system of the present invention.

FIG. 1 is a block diagram of the integrated data collection and transmission system of the present invention. As shown in FIG. 1, there are various components that make up the integrated system of the present invention. Central to the present invention is that the various components can communicate and share information so that information collecting, processing, and storage can be effected as rapidly as possible so that device operations can be managed via an integrated, unitary system. In this way, users of the system and the ultimate customers can have prompt or even immediate access to information concerning major or all aspects of the package delivery system. Additionally, by integrating all of the components of the system, the information can be most efficiently stored, routed, and accessed by the users of the system.

As shown in the block diagram of FIG. 1, the integrated system 100 of the present invention includes a data collection device 101. The data collection device 101 is used to collect package information from customers and is generally used by couriers and other personnel. The data collection device 101 preferably has various input elements such as a bar code scanner, a keyboard, and/or a touch screen for the input of package data. Specific details of the data collection device 101 are described in greater detail below. The data collection device 101 also includes a CPU and a memory for storing data such as generic system information and/or collected package data as well as a means for communicating the data between various of the other components of the integrated system 100. Such means can include an infrared communications port and/or a microradio or a similar communications device or system that allows automatic transmission of communications between the data collection device 101 and one or more peripheral devices whenever the data collection device 101 and the peripheral devices are within a preselected distance range and/or within a preselected orientation.

In accordance with a preferred implementation of the present invention, the data collection device 101 can include both an infrared communications port 111 and a microradio 112 so that in the case of a failure of one of these communications links, the other can be used. In addition, the data collection device 101 can include a telephone communications port, such as a modem or an acoustic coupler, to allow for transmission of data over a telephone line or over a cellular phone system.

Via the infrared communications port 111 or microradio 112, the data collection device 101 can communicate with one or more of a plurality of peripheral devices 102–105 and with one or more of a plurality of intermediate data storage devices 106–108 and 113–114. The peripheral devices 102–105, the details of which are described in detail below, receive a communication from the data collection device and based on the receipt of the communication or the substance of that communication perform one or several operations related to package tracking. In the preferred application of integrated system 100, the data collection device 101 includes software such that it will automatically follow one or more preselected routines whenever it comes within a preselected distance and/or orientation from a peripheral device and is actuated, either by input of the user or by automatic communication with the peripheral device.

Similarly, in the preferred application of the device, the peripheral device will include a CPU and associated software such that the peripheral device will automatically follow one or more preselected routines, in response to the receipt of the communication, and in response to its review of the substance of the communication. Depending on the peripheral device, there can be a one-way or two-way communications link established between the data collection device 101 and the various peripheral devices 102–105. If the peripheral device is programmed to provide a communication to the data collection device 101, the substance of the communication is ultimately placed within its memory.

Moreover, the data collection device 101 preferably will follow one or more preseleted subroutines, based upon the receipt of the substance of the communication from peripheral device 102–105. The peripheral devices can include a printer 102, a data transfer device 103, a storage facility 104, and an admonishment device 105. Details of these peripheral devices are shown and described with respect to FIGS. 4 through 7.

The data collection device 101 also communicates with one or more of the intermediate storage devices 106–108 and 113–114, preferably via one of the infrared communications port 111 and microradio 112. As shown in FIG. 1, in accordance with the present invention, as necessary, the intermediate storage device depicted as the belt device 106 can communicate with other of the intermediate storage devices such as the DADS terminal 108 via an infrared communications port or a microradio and with the central data storage facility 109. The intermediate storage devices 106–108 and 113–114 receive and store package information and, as appropriate, can transmit information or instructions to the data collection device 101.

As also shown in FIG. 1, the intermediate storage devices 106–108 and 113–114 communicate with a central data storage facility 109. The central data storage facility 109 acts as a warehouse for the package data and is accessible to provide information about the shipment of packages to customers and shipper personnel. In the Federal Express package tracking system, the central data storage facility is known as COSMOS (Customer Operations Service Master On-line System). COSMOS is a sophisticated electronic network that tracks the status of every shipment in the Federal Express system. COSMOS connects the physical handling of packages and related information to the major data systems at Federal Express and, in turn, with customers and employees.

Primary to the integrated system of the present invention is the data collection device 101, which is used primarily to collect and store information about packages to be shipped. However, in accordance with the present invention, the data collection device 101 is also capable of performing other, secondary, functions related to package delivery via communications with one or more of the peripheral devices 102–105.

The data collection device 101 can take several forms, but will generally fall into two categories, the enhanced Supertracker (EST) and the Power Pad. Federal Express, assignee of the present invention, has used a device known as the Supertracker as a data collection device. The Supertracker is a relatively small, battery powered device used by Federal Express personnel for collecting data relative to packages to be shipped. The Supertracker includes an alphanumeric keyboard and a contact bar code scanner to collect information. It also includes a CPU and a memory. The collected information is stored in the memory and can be communicated to an intermediate storage device via an LED or an acoustic coupler. When information is transferred via the LED, the Supertracker had to be physically in contact with the device with which it communicates.

Figure 2:
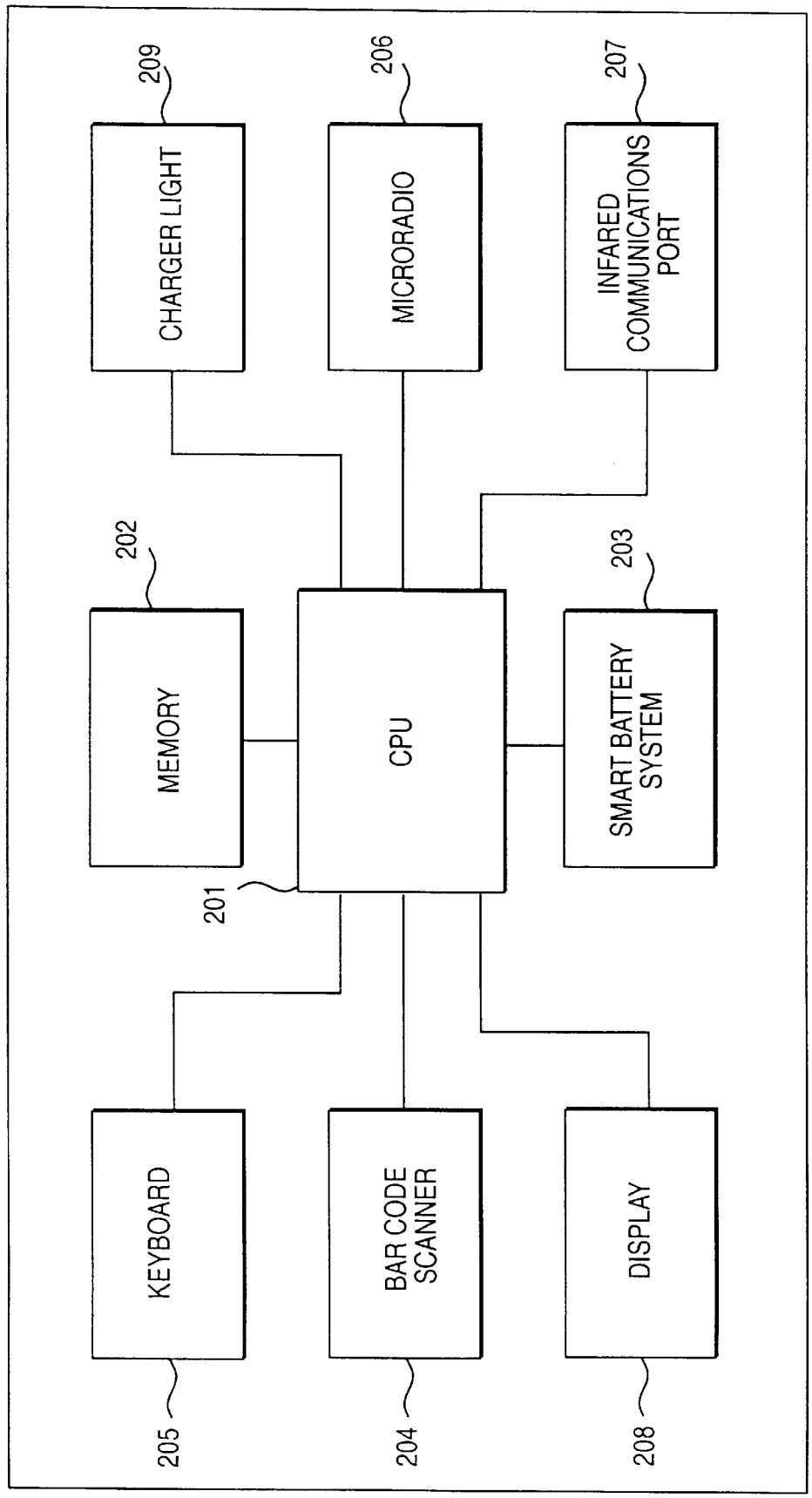
FIG. 2 is a block diagram of an EST in accordance with the present invention.

The EST, a block diagram of which is shown in FIG. 2, has significant advantages over the currently used Supertracker. As shown in FIG. 2, for package data collection, the EST 200 includes a keyboard 205, coupled to CPU 201. Keyboard 205 includes a full array of alphanumeric buttons. Preferably, the keyboard 205 glows in the dark to enhance usability. EST 200 also includes a display 208, which is preferably a liquid crystal display (LCD). Display 208 is preferably mounted within the EST 200 by a series of display floats, which are essentially like foam doughnuts, to prevent shock to the EST 200 from being transferred to display 208 or from display 208 to keyboard 205. EST 200 also includes a bar code scanner 204, which may comprise one or more of a contact bar code scanner, a non-contact laser scanner, and a CCD, which is also coupled to CPU 201.

Data input via keyboard 205 and bar code scanner 204 is stored in memory 202, which preferably comprises several 16 Mbit flash memory chips, though the number and configuration of the memory elements is within the purview of one of ordinary skill in the art.

EST 200 also includes a smart battery system 203. The smart battery system 203 comprises the primary power source of the EST 200, which is a pack preferably consisting of two AA NiCad batteries surrounded by a plastic strap. The smart battery system 203 is also preferably capable of providing information about battery usage and power level to the user. The smart battery system 203 preferably comprises a connector and an EEPROM mounted on a small circuit board to permit the EST 200 to store timely information about the energy capacity of the batteries, the number of times the pack has been charged and discharged, the temperature of the batteries, the history of the batteries, a requirement for a deep cycle, and a requirement for recycling. This information can be output to the user via display 208. For example, display 208 can include a fuel gauge that graphically represents to the user the relative amount of battery power left in the batteries. In addition, the EST 200 output via display 208 instructions regarding requirements for deep cycling and recycling the batteries.

The smart battery system 203 also preferably periodically determines the power consumed by the EST 200 and controls at least one of the output or operation of the EST 200 based on that determination. For example, if the smart battery system 203 determines that the battery power of the EST 200 is about to expire, that is that the power level of the batteries is at a preselected level, the smart battery system 203 will instruct the CPU 201 to shut down the device. In accordance with this operation, the user can be provided with a visual or audio alert advising him that the EST 200 is about to cease operating.

The smart battery system 203 also controls the recharging of the batteries, based on a determination of the power consumption of the device. That is, if little power has been consumed, the smart battery system will control the battery recharge operation so that the batteries are not excessively recharged. This extends the useful life of the batteries. In addition, the EST 200 includes a charger light 209 that provides a visual indication when the EST 200 is being charged.

The EST 200 also includes an infrared communications port 207, which permits infrared communications with other devices of the integrated system 100. The infrared communications port 207 preferably comprises two infrared emitters and one infrared detector located near the contact scan tip. The infrared communications port 207 of EST 200 may preferably comprise a Crystal Semiconductor CS8130 infrared data association (IrDA) compliant controller or similar device. In operation the infrared communications port 207 preferably uses either the IrLAP or Direct Mode communications protocols, or other similar protocol. Other components of integrated system 100 use the same type of infrared communications port and communications protocols.

Furthermore, the EST 200 also preferably includes a microradio 206, which permits radio communications with other devices of the integrated system. In the Federal Express system, the microradio is configured to transmit over the courier area network. In accordance with the present invention, a standard microradio can be employed, which communicates over a maximum distance of, for example, approximately 20 feet.

Figure 3:
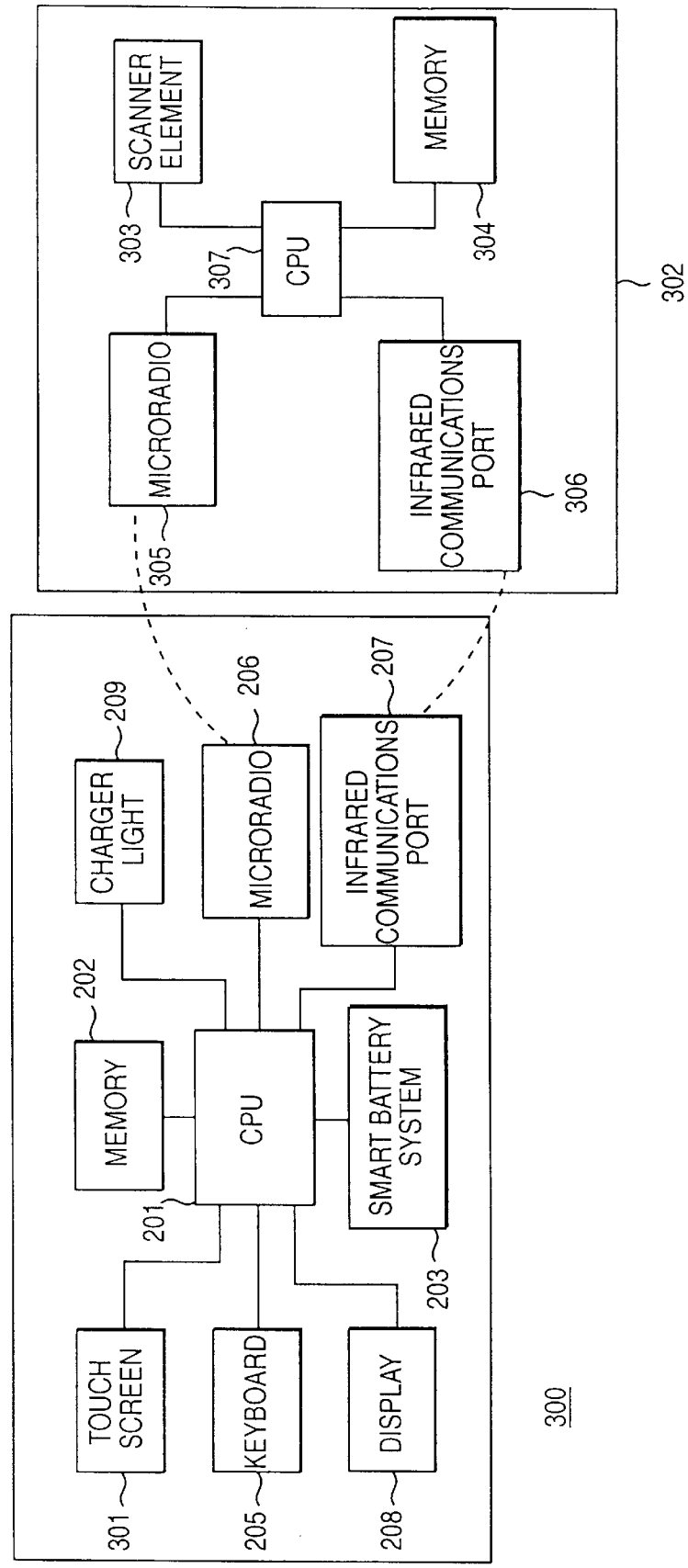
FIG. 3 is a block diagram of a Power Pad in accordance with the present invention.

As indicated above, data collection device 101 can also preferably comprise a Power Pad. FIG. 3 is a block diagram of the Power Pad 300. The Power Pad 300 includes many of the same components as the EST 200, the common elements of FIGS. 2 and 3 being labeled with the same reference numerals. In addition, the Power Pad includes a touch screen 301. The touch screen 301 can be used with a stylus (not shown) to input package information. In addition, the touch screen can be used to capture signature information of a person sending a package or signing for a received package. Power Pad 300 can also be used to receive, store, and display, as necessary, dispatch information for a particular courier. In addition, Power Pad 300 can be used as a courier notebook, thereby allowing a courier to enter and maintain notes and information about his route and associated operations. Power Pad 300 can also store and maintain maps, dangerous goods information, international delivery information, news updates, the service reference guide, zip codes, and a cash-only customer list, as well as other information that may be useful for the courier. In addition, the Power Pad 300 can provide instructions to the courier based on their level of experience, can provide performance feedback to the courier, and can provide address verification.

The bar code scanner 302 of the Power Pad 300 is preferably not integral to the device, but rather is a physically separate item. For example, the bar code scanner 302 preferably comprises a scanning device in the shape of a large ball point pen. Bar code scanner 302 preferably comprises a scanning element 303, which may include one or more of a contact scanner, a non-contact laser scanner and a CCD, a memory 304, a microradio 305, and an infrared communications port 306. These components are controlled by a CPU 307. As shown in FIG. 3, the microradio 305 and infrared communications port 306 of bar code scanner 302 communicate respectively with the microradio 206 and infrared communications port 207. Bar code data collected by bar code scanner 302 is thus transferred to memory 202.

It is understood that the keyboard 205 of the Power Pad 300 can be implemented as a part of the touch screen 301 or can be a separate element. This is also true with respect to the charger light 209.

Figure 4:
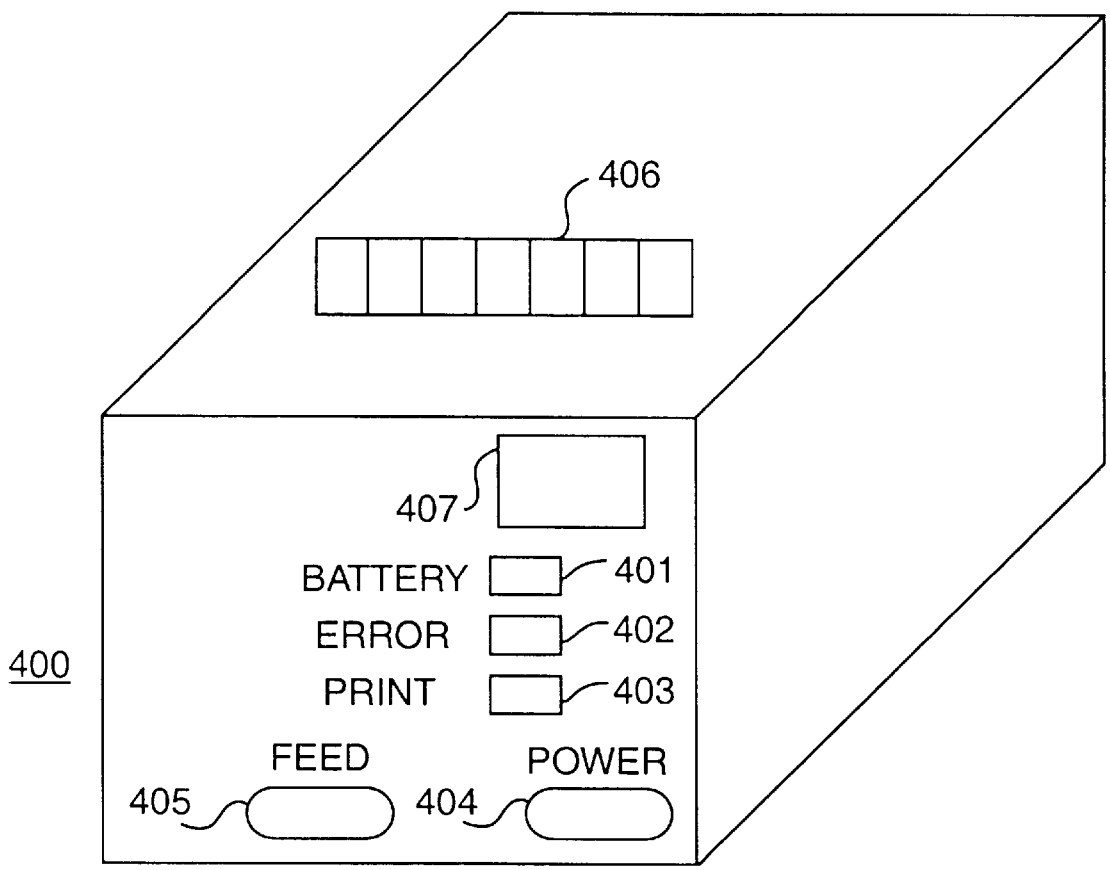
FIG. 4 is a schematic diagram of a printer in accordance with the present invention.

The EST 200 and the Power Pad 300 can communicate with one or more of a plurality of peripheral devices 102–105. One such peripheral device is a printer 102. FIG. 4 is a schematic diagram of a printer that may be used in accordance with the present invention.

The printer 400, shown in FIG. 4, is preferably a portable device, such as the Federal Express Astra printer, that can be carried by a courier using a shoulder strap (not shown), though a stand-alone, non-portable printer can also be used in accordance with the present invention. The printer 400 is preferably used in conjunction with data collection device 101 to print shipping labels or other required paperwork. Printer 400 includes various LEDs 401–403 indicating, respectively, battery level 401, an error indication 402, and print status 403. In addition, the printer includes a power switch 404 and a feed button 405 to feed paper through paper feeder 406. The printer 400 also preferably includes a communications port 407 capable of receiving information from the data collection terminal 101. Communications port 407 preferably comprises one or both of an infrared communications port and a microradio. Printer 400 also includes a memory and a CPU for processing, and storing information from data collection device 101 input through the communications port 407.

In operation, if the user of the data collection terminal 101 wants to print, for example, a label or a receipt, he will enter a print command into, for example, the keyboard of data collection terminal 101. The communications port of the data collection device 101 will communicate this information to the communications port 407 of the printer 400 and a label or other appropriate document will be printed.

Whether the printer 400 uses an infrared communications port or a microradio or both, these elements are preferably always in a receive ready state. With the use of infrared communications, there is a required alignment and distance between the printer 400 and the data collection device 101, whereas using a microradio, the only requirement is that the two devices be within a predetermined distance of one another.

Figure 5:
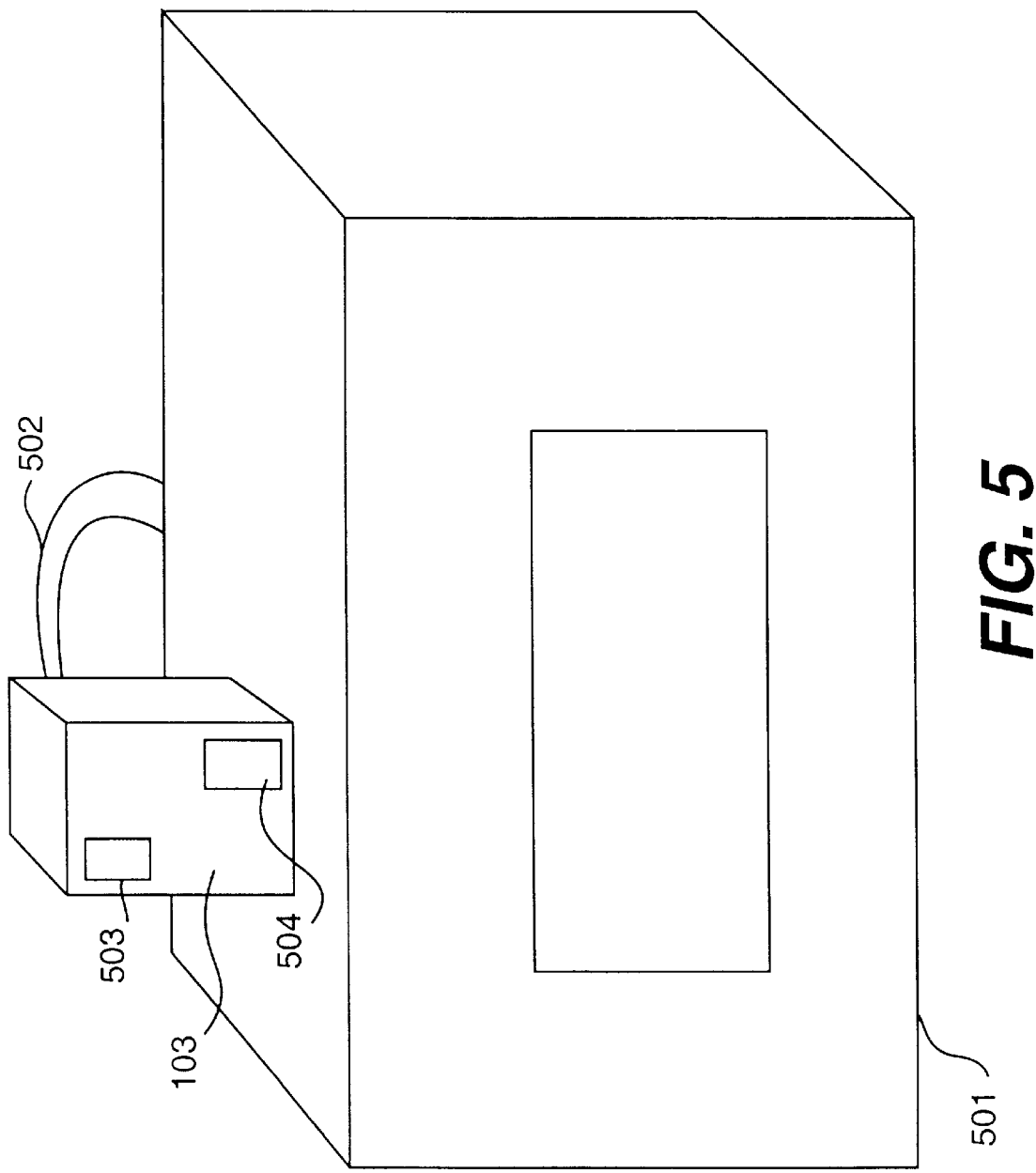
FIG. 5 is a schematic diagram of a data transfer device in accordance with the present invention.

Another peripheral device that can receive communications from the data collection device is a data transfer device 103. FIG. 5 is a schematic diagram of a data transfer device in accordance with the present invention. The data transfer device 103 in accordance with the present invention is used to communicate information from, for example, a customer's personal computer (PC) to a data collection device 101. For example, information about package tracking entered by the customer using the Federal Express POWERSHIP PASSPORT™ system or other appropriate system can be transmitted to the data collection device 101 via the data transfer device 103.

As shown in FIG. 5, the data transfer device 103 is coupled to customer PC 501 via a cable 502. Alternatively, the data transfer device can be coupled to the PC 501 via an infrared communications link, or other suitable means. The data transfer device 103 includes an infrared communications port 503 for communication with the data collection terminal 101 and may also include a microradio 504 for such communication. In addition, the data transfer device 103 includes associated control circuitry and buffer memory needed to receive and send data from the PC 501 to the data collection device 101. In addition, the PC 501 and the data collection device 101 include the software required for the devices to communicate via the data transfer device 103.

Figure 6:
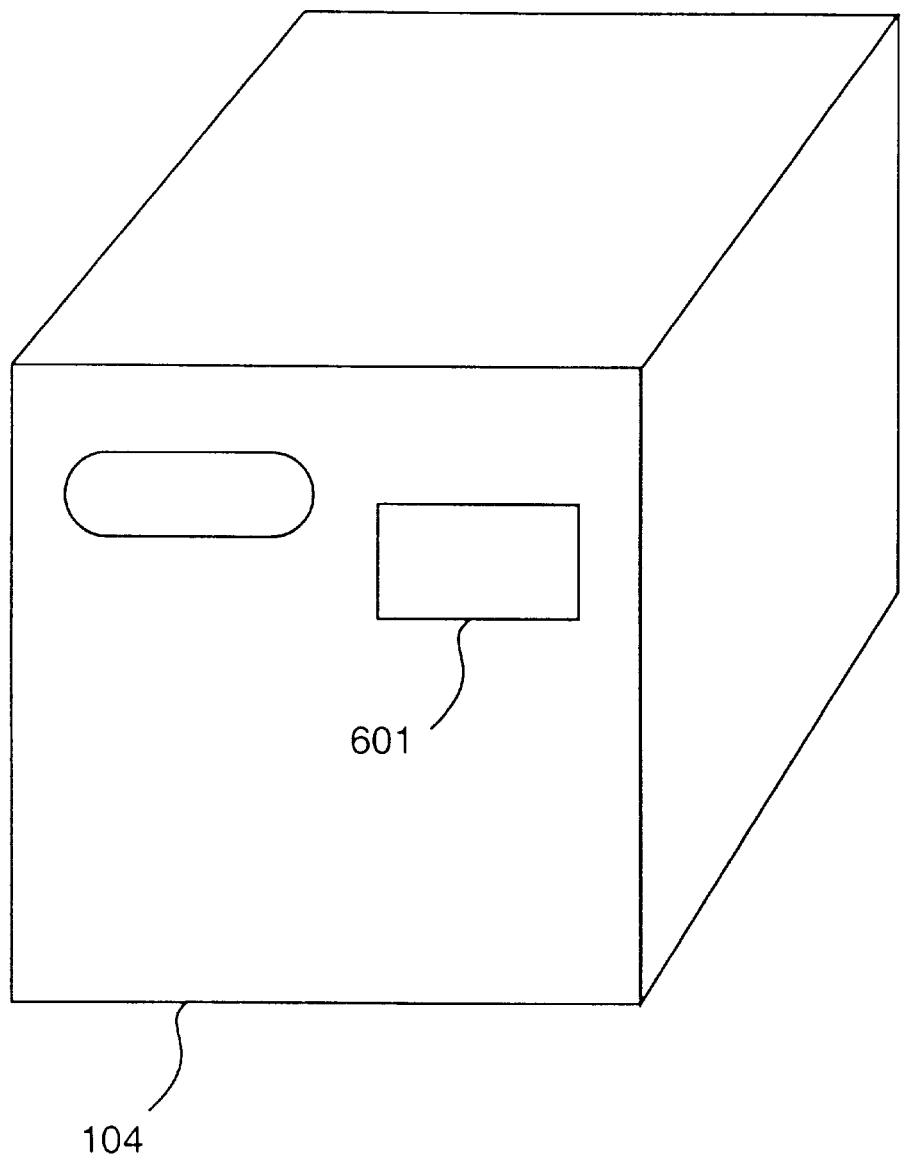
FIG. 6 is a schematic diagram of a storage facility in accordance with the present invention.

Another peripheral device that is capable of receiving communications from the data collection device 101 is storage facility 104. FIG. 6 is a schematic diagram of a storage facility in accordance with the present invention.

In a preferred implementation, storage facility 104 is a drop box, where customers can leave packages for subsequent pick-up by Federal Express personnel. In accordance with the present invention, the storage facility 104 can be fitted with a communications port 601 comprising one or both of an infrared communications port and a microradio. By so equipping the storage facility, the courier can open the storage facility without requiring the use of a key. For example, when a preselected communication is received by the port or microradio associated with the storage facility, the lock on the facility would be opened. This eases operations for the courier and enhances the security of remote storage areas. Similarly, in accordance with the present invention, other devices can be provided with a communications port to enable keyless entry via Federal Express personnel using their data collection device 101.

Figure 7:
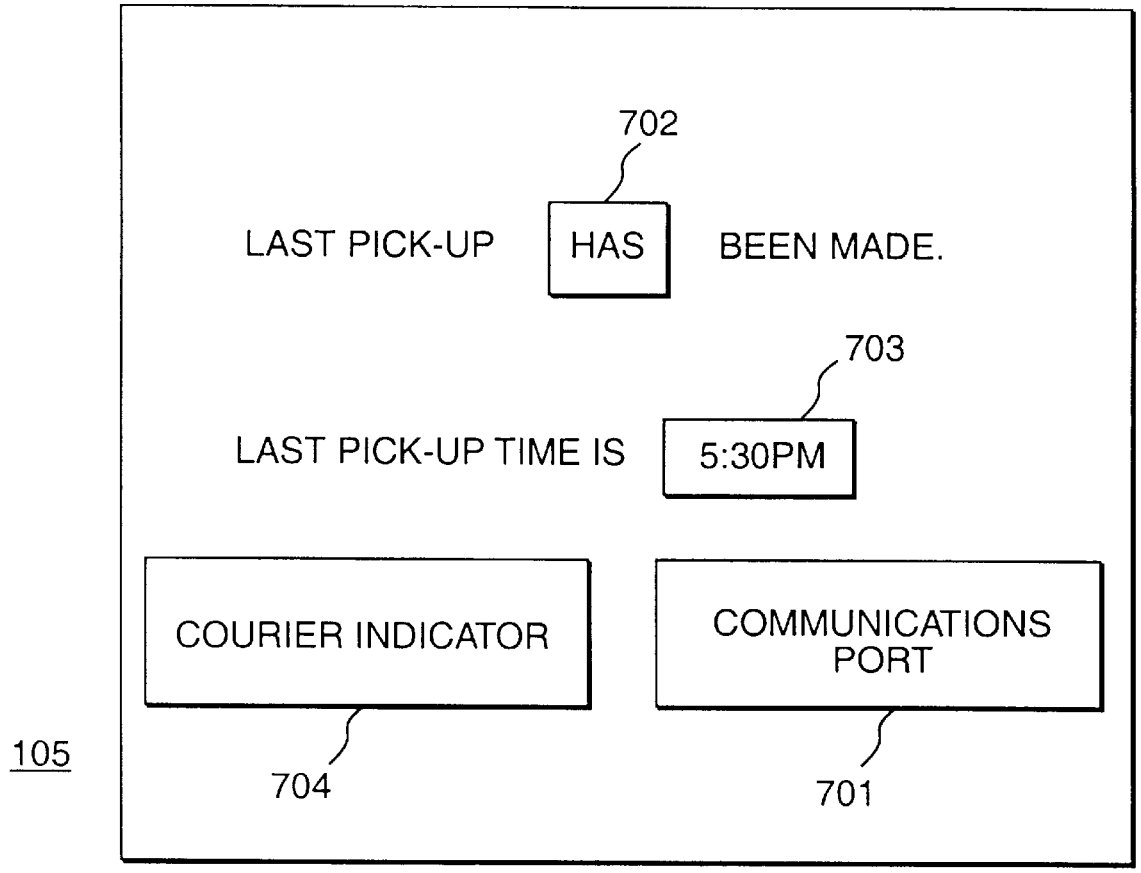
FIG. 7 is a schematic diagram of an admonishment device in accordance with the present invention.

Yet another peripheral device that is capable of receiving communications from the data collection device 101 is admonishment device 105. FIG. 7 is a schematic diagram of an admonishment device in accordance with the present invention.

Admonishment device 105 preferably advises customers whether package pick-up from a particular storage facility, or drop box, has been made and is preferably physically attached to the storage facility. Admonishment device 105 includes a communications port 701, which includes one or both of an infrared communications port and a microradio. Via communications port 701, the admonishment device 105 can receive information from a data collection device 101. For example, a courier can set a pick-up indicator 702 via remote communication from his data collection device 101 through communications port 701 to indicate that the last pick-up of the day has occurred. In that way a later arriving customer will know not to leave a package if they want it picked up that day. In addition, the data collection device 101 can provide information to a time indicator 703 to set the time of the last pick-up. This time can vary depending on the day of the week and the weather conditions, for example. In this way customers can be advised of the last time for package pick-up and can plan their actions accordingly. Alternatively, or in addition, admonishment device 105 can include a courier indicator 704 advising the courier whether there are any packages in the drop box for pickup. Courier indicator 704 preferably comprises a visual display advising the courier whether there are any packages in the storage facility that need to be picked up.

It is also contemplated that in accordance with the present invention, the admonishment device 105 can send a communication to the data collection device 101 advising the courier whether there are any packages in a particular storage facility. Such a communication would preferably be sent via communications port 701. By receiving such a communication the courier would avoid having to physically check the storage facility if there are no packages there. It is also contemplated that admonishment device 105 could communicate the status of the storage facility to a central dispatch station, which could then dispatch such information to the data collection device 101 of the courier responsible for the particular storage facility.

In accordance with the present invention, the communication from the data collection device 101 may activate circuitry in the admonishment device 105 to rotate a wheel 705a, 705b or otherwise cause a visual indication regarding the status of pickup and the time of last pickup. In addition, it is also contemplated that the indications 702 and 703 can be provided by an informational display, which can be one of an LCD, a series of LEDs, or a vacuum florescent display.

As explained above, the data collection device 101 is capable of communicating with one or more intermediate storage devices 106–108 and 113–114, which are described below with reference to FIGS. 8–12.

Figure 8:
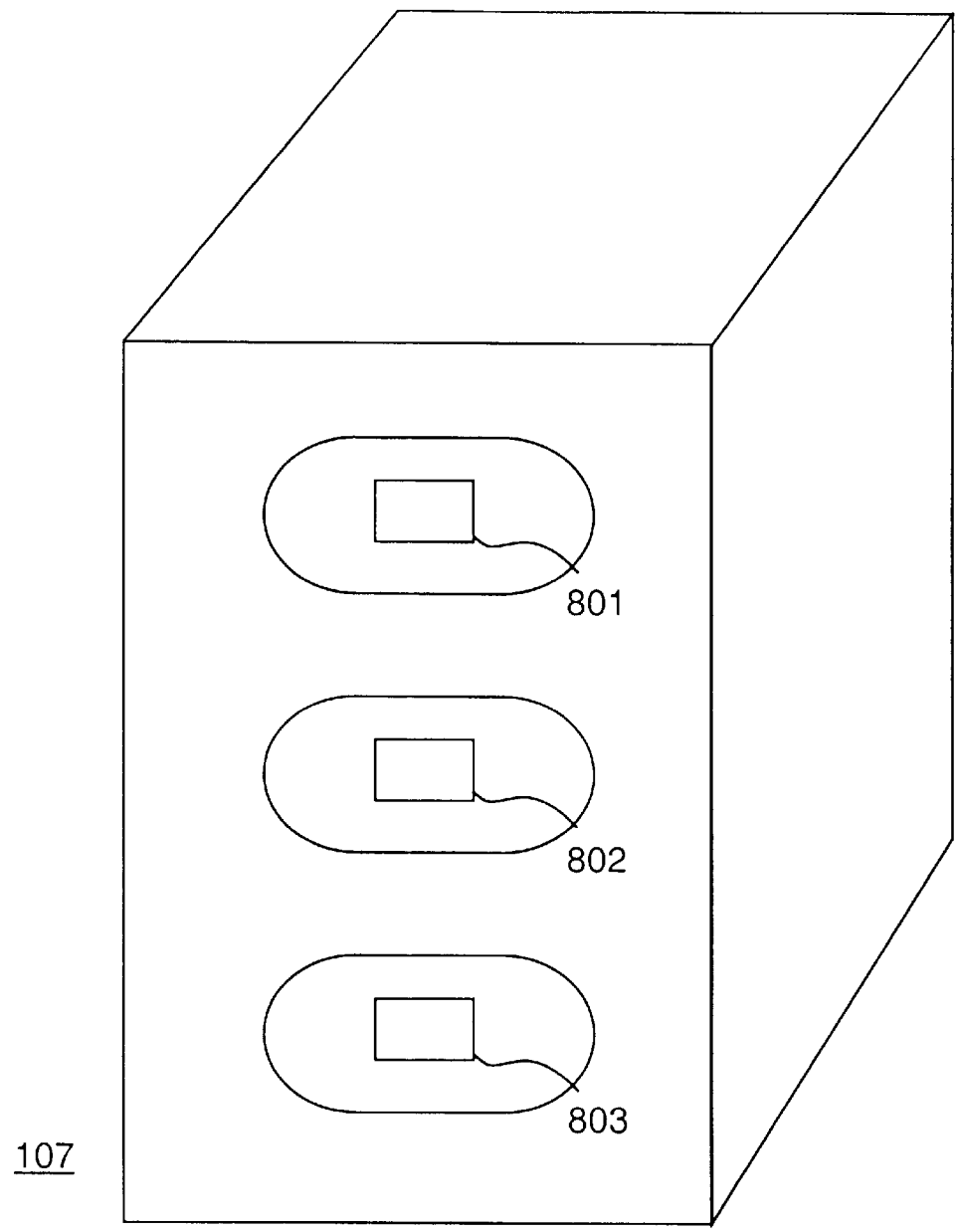
FIG. 8 is a schematic diagram of a docking station in accordance with the present invention.

One of the intermediate storage devices is a docking station 107. FIG. 8 is a schematic diagram of a docking station in accordance with the present invention. Docking station 107 is preferably located at a central shipping location, for example, where the courier goes to unload or pickup packages. The docking station 107 preferably comprises a number of ports 801–803, each of which are capable of receiving a data collection device 101. Via one of an infrared communications link or microradio, the data stored in the data collection device 101 is transmitted to a data storage device in the docking station 107, which subsequently transmits the data to the central data storage facility 109.

Docking station 107 is used, for example, at the end of a courier's shift to transmit all previously collected data, ultimately to the central data storage facility 109. Selected portions or all of the memory of the data collection device 101 can then be erased and the data collection device will be ready for additional data collection. In addition, the docking station 107 can receive communications from the central data storage facility 109 for transmission to the data collection device 101. For example, via docking station 107, the central data storage facility 110 can communicate updated software or other information related to package tracking, for example, updated postal codes, to the data collection device 101. Docking station 107 is also preferably used for recharging the batteries of data collection device 101.

Another intermediate storage device used in the system in accordance with the present invention is DADS terminal 108. The DADS (Digitally Assisted Dispatch System) system is the Federal Express nationwide electronic dispatch network, which utilizes a number of DADS terminals. Typically, the DADS terminal is located within the courier vehicle, though the DADS terminal could also be portable and be carried in a backpack by the courier. Previously, after package data was collected by the data collection device 101 at a customer site, the data collection device 101 was placed into "shoe" in the DADS terminal. The DADS terminal would thus upload the data from the data collection device 101 to the central data storage facility 109, via, for example, a radio.

In accordance with the present invention, physical contact between the DADS terminal and the data collection device 101 is unnecessary for data transfer between the devices to occur. As a result, information about package delivery can be made available at the central data storage facility 109, and hence to the customer, much more quickly and easily. In accordance with the present invention, once the data collection device 101 is within a predetermined distance and orientation of the DADS terminal 108, in the case of infrared communications, and within a predetermined distance in the case of microradio communications, the data collection device 101 will automatically transmit data to the DADS terminal. In the alternative, the user can initiate the communication by physically activating a key or otherwise inputting an instruction to the data collection device 101.

Preferably, the DADS terminal will also substantially transfer data or instructions to the data collection device 101, for example, in response to a communication from data collection device 101 or upon receipt of a preselected command or data input. In an alternate embodiment, the data collection device 101 can be manually actuated to permit such communication. In either event, such communication avoids having to physically connect the data collection terminal 101 and the DADS terminal for information transmission.

Figure 9:
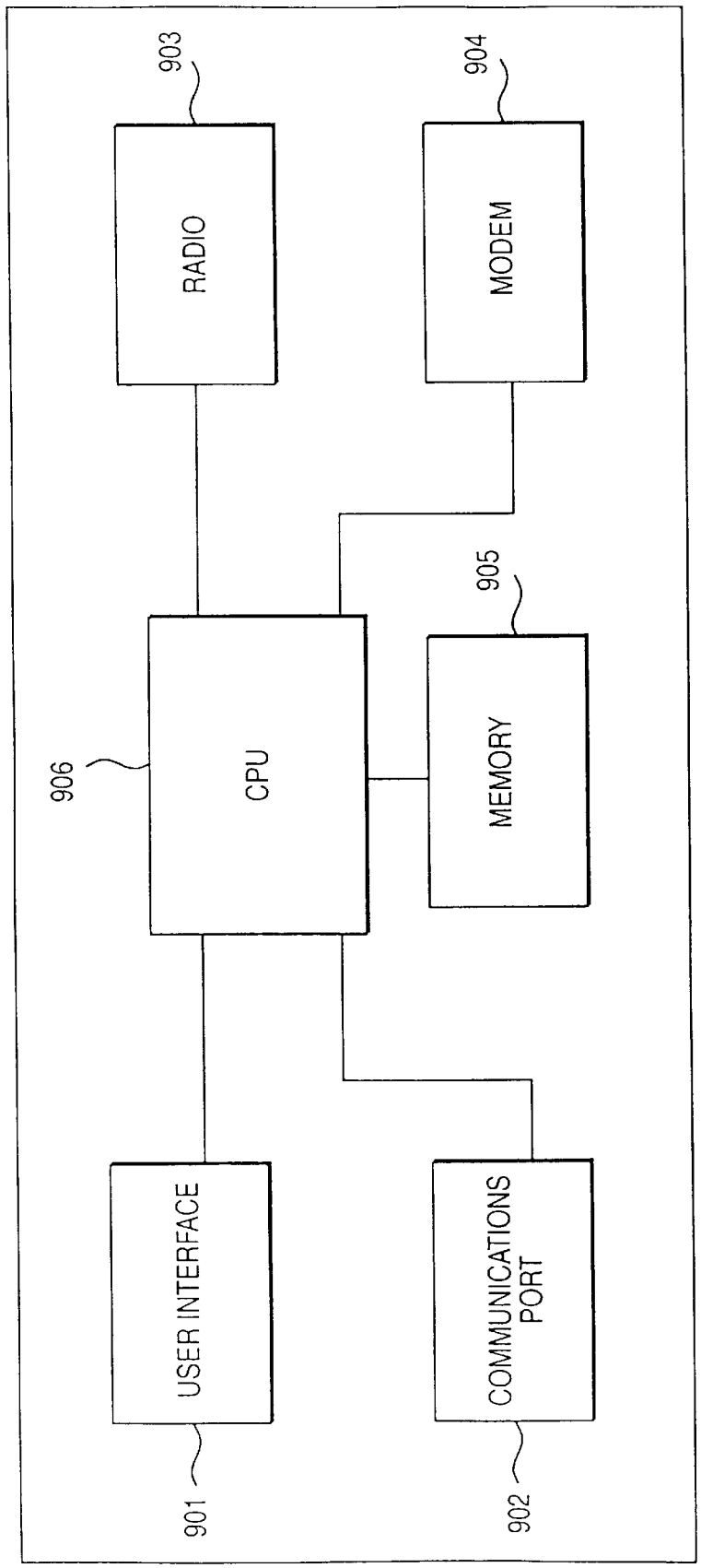
FIG. 9 is a block diagram of a DADS terminal in accordance with the present invention.

FIG. 9 is a block diagram of a DADS terminal in accordance with the present invention. The DADS terminal 108 preferably includes a user interface 901, which includes, generally a keyboard for data entry and a screen to display information input via the keyboard and to display information transmitted from the central data storage facility 109, or other remote source such as a dispatching station. The screen can also display information about the status of information received from the data collection device 101. User interface 901 can be integral with the remainder of the components of DADS terminal 108 or can be separate from them. In accordance with the present invention, it is contemplated that the user interface 108 can be separately mounted in the courier vehicle, for example on a swivel mount, while the remainder of the components can be situated elsewhere in the courier vehicle.

DADS terminal 108 also includes a communications port 902 for receiving information from the data collection device 101, which may include one or both of an infrared communications port and a microradio. In addition, DADS terminal 108 also preferably includes a radio 903, which is a relatively high-powered radio, and a modem 904 for communicating data stored in memory 905 to the central data storage facility 109. It is contemplated that radio 903 and modem 904 can be integrated into a single unit, as desired. Operation of DADS terminal 108 is controlled by CPU 906 and/or command inputs from the user.

Figure 10:
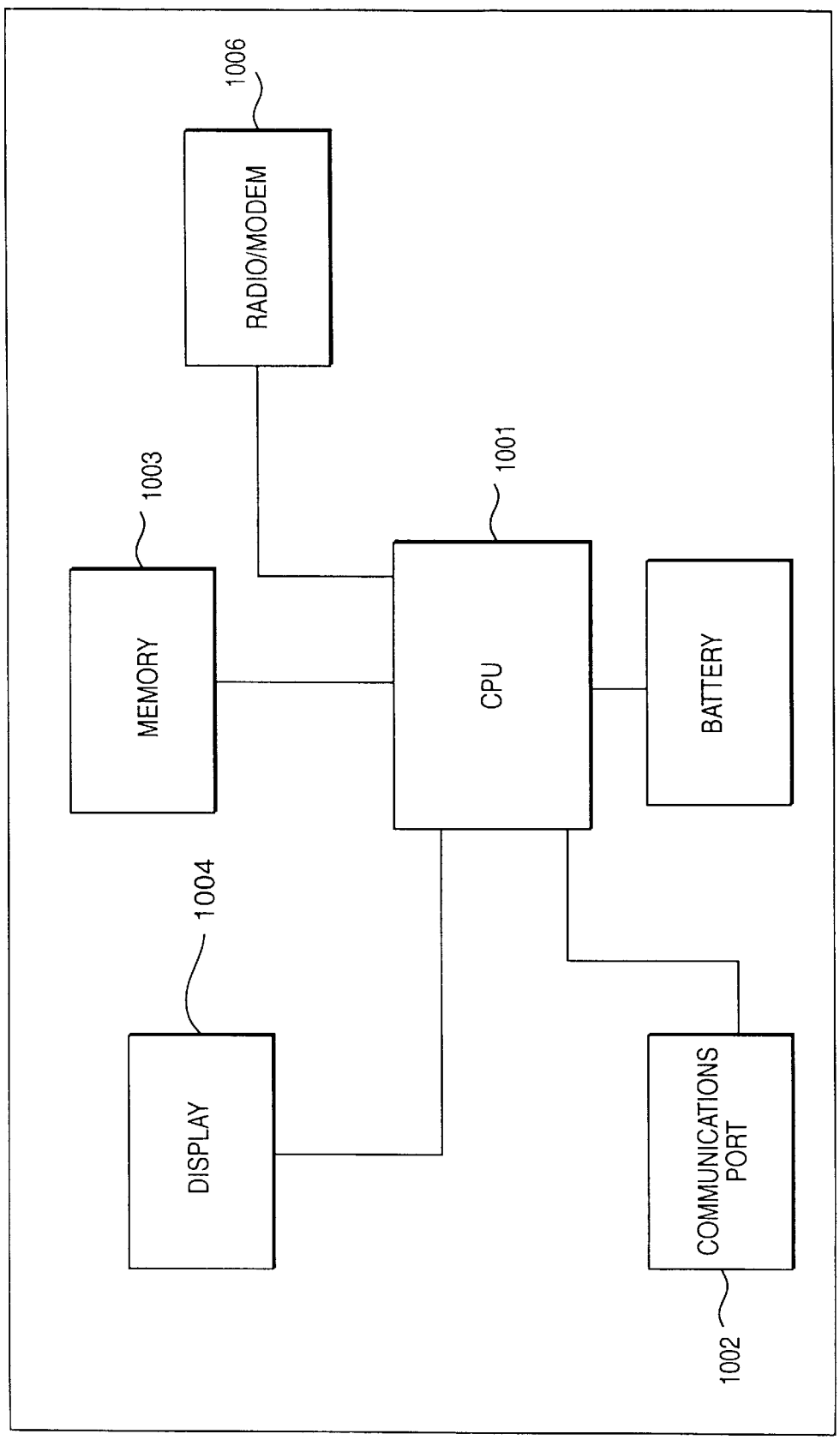
FIG. 10 is a block diagram of a belt device in accordance with the present invention.

Another intermediate storage device is belt device 106. FIG. 10 is a block diagram of a belt device in accordance with the present invention. The belt device 106 of the present invention is preferably body wearable and may, as the name implies be attached to the user's belt. Of course the belt device 106 could be attached elsewhere on the user's body. Preferably belt device 106 is fairly small, about twice the size of a typical pager, and will not impede normal courier activities.

Belt device 106 is used in conjunction with a data collection device 101 and provides for almost real-time transmission of package data to either central data storage facility 109 or DADS terminal 108. Belt device 106 will typically be used in situations where transmission of package data between the data collection device 101 and central data storage facility 109 or DADS terminal 108 will be delayed because the courier will not be returning to his vehicle for some time to transmit the collected information. This may occur in high density areas where the courier will, for example, spend a good deal of time in a single building collecting and/or delivering packages. By using the belt device 106, package information can be transmitted to the either the central data storage facility 109 or DADS terminal 108 before the courier is within the predetermined distance requirement for infrared or microradio communications required by the data collection device 101. In this way the package shipper can fulfill its commitment to providing its customers access to information about their packages within a predetermined time.

Belt device 106 receives package information from the data collection device 101 via the communications port 1002. The communications port 1002 can be one or both of an infrared communications port and a microradio. The information is then stored in a memory 1003, which is preferably a buffer memory. At predetermined intervals and under the control of CPU 1001, a radio/modem 1006 transmits the stored information to central data storage facility 109 or to another intermediate storage device, such as DADS terminal 108. Radio/modem 1006 preferably comprises a medium range radio that can transmit within, for example, a five mile range. Optionally, the belt device 106 can also include a display 1004 that can output, for example, status information to the user. Display 1004 can be a screen or a series of LEDs, for example.

Figure 11:
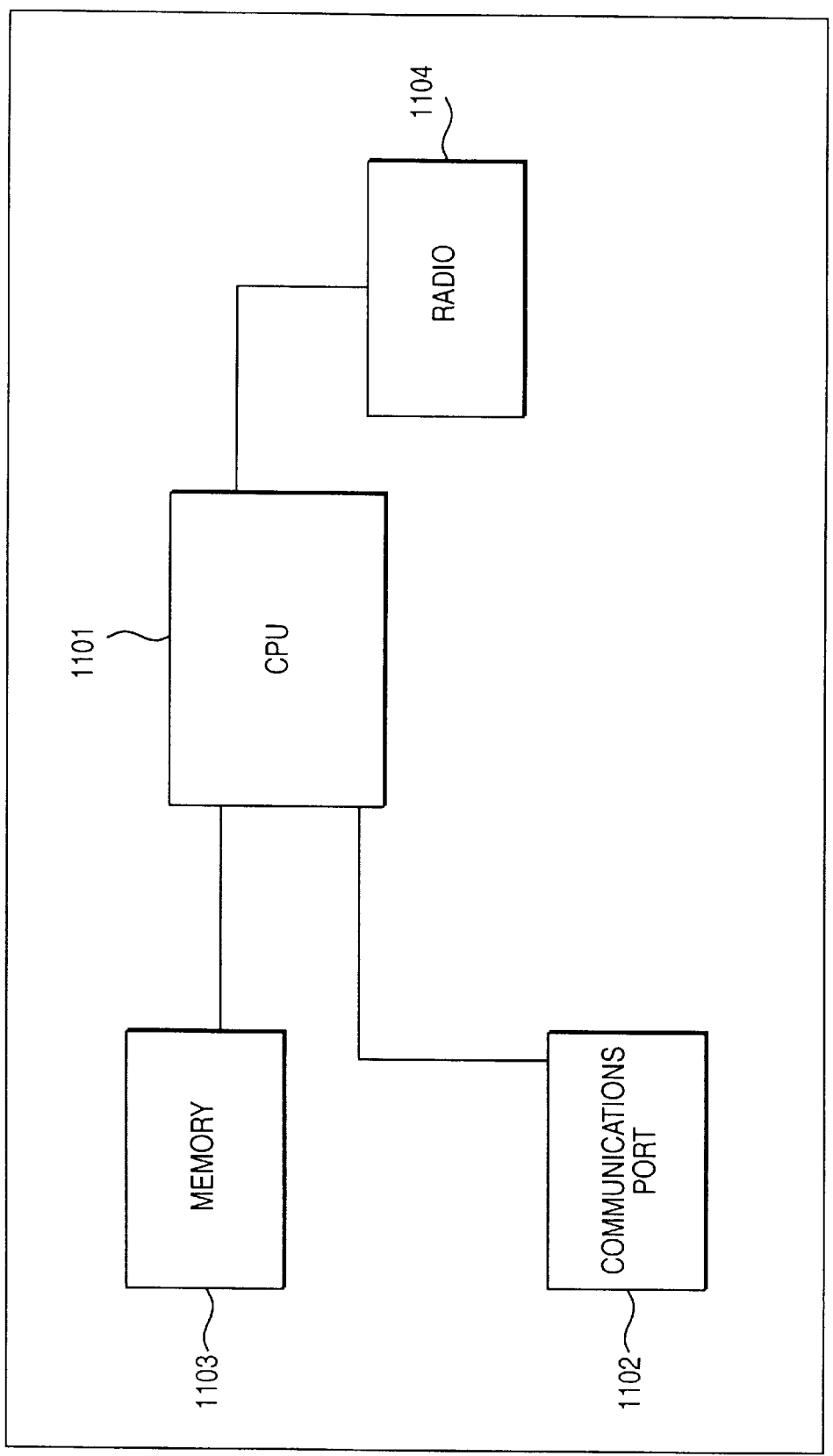
FIG. 11 is a block diagram of a conveyor device according to the present invention.

Another intermediate storage device is conveyor device 113. FIG. 11 is a block diagram of a conveyor device according to the present invention.

Conveyor device 113 is preferably connected to a conveyor belt that is located in a hub location where for example package delivery vehicles transfer packages. Couriers or other package delivery personnel scan packages with a data collection device 101 when the packages are transmitted along a conveyor belt. The information collected by the data collection device is then preferably transmitted to conveyor device 113, which stores the package information and transmits it to the central data storage facility 109. In this way the central data storage facility 109 receives virtually real-time information about the status of packages while in transit.

Conveyor device 113 includes a communications port 1102, which preferably comprises one of an infrared communications port and a microradio, which receives information from data collection device 101. The information is stored in a memory 1103, which is preferably a buffer memory and is then transmitted to central data storage facility 109 via radio 1104, which is preferably a medium range radio capable of transmitting in a range of, for example, five miles. Operation of conveyor device 113 is controlled via CPU 1101.

Figure 12:
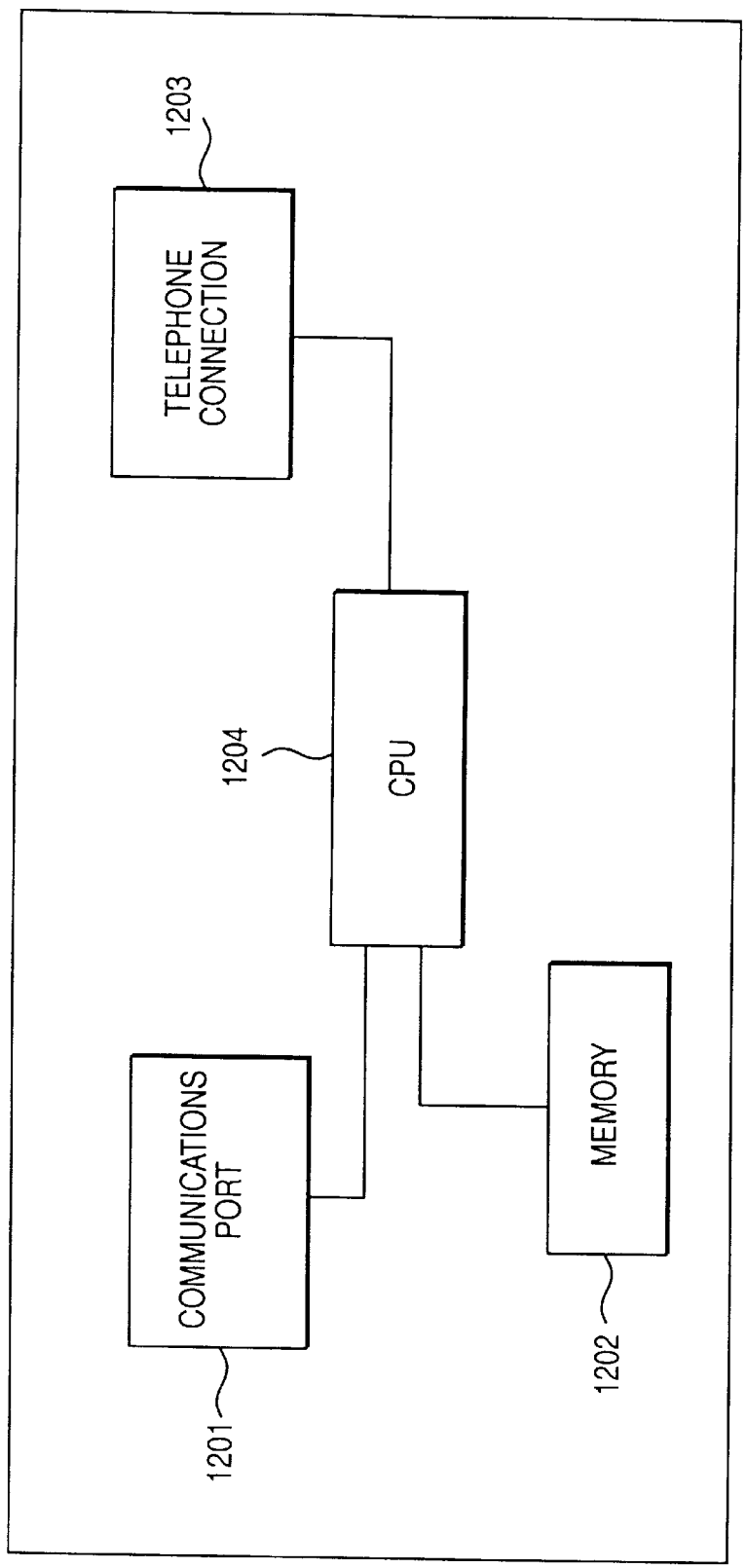
FIG. 12 is a block diagram of an STCID in accordance with the present invention.

Yet another intermediate storage device is a Supertracker Communication Interface Device (STCID) 114. FIG. 12 is a block diagram of an STCID in accordance with the present invention.

STCID 114 enables communications from a data collection device 101 directly to central data storage facility 109 over, for example, a pay telephone. STCID 114 includes communications port 1201, which preferably includes one or both of an infrared communications port and a microradio, and which receives information from a data collection device 101. The information is stored in a memory 1202. When it is desired to transmit the stored information, the STCID 114 is coupled to the receiver of a telephone via telephone connection 1203. In a preferred embodiment of the present invention, the STCID is approximately the size of a flip-phone and the telephone connection 1203 includes elements, preferably in the form of cups, that fit over the speaker and microphone cups of the telephone to which the STCID 114 is connected. Receipt, storage, and transmission of information via STCID 114 is controlled by CPU 1204.

As described above and shown in the associated drawings, the present invention comprises an integrated system and method for the collection and transmission of data related to package delivery. The figures and accompanying discussion, illustrate and describe presently preferred embodiments and methods of the present invention. Those skilled in the art will understand that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. An integrated data collection and transmission system for package tracking comprising:
   a data collection terminal capable of collecting and storing package tracking data, the data collection terminal including one of an infrared communications port and a micro-radio;
   at least one peripheral device, associated with the data collection terminal, the peripheral device including one of an infrared communications port and a micro-radio for receiving at least one communication from the data collection terminal and for performing a preselected operation related to package tracking based on the at least one received communication;

an intermediate data storage device, associated with the data collection terminal, the intermediate data storage device including one of an infrared communications port and a micro-radio for receiving the collected and stored package tracking data from the data collection terminal; and a central data collection facility, capable of communicating with the intermediate data storage device, for receiving the collected and stored package tracking data from the intermediate data storage device and for maintaining an accessible package tracking database based on the collected and stored package tracking data.

2. The integrated data collection and transmission system for package tracking as recited in claim 1, wherein communication between the data collection terminal and the at least one peripheral device occurs automatically.

3. The integrated data collection and transmission system for package tracking as recited in claim 1, wherein communication between the data collection terminal and the at let one peripheral device is activated by a user of the data collection.

4. The integrated data collection and transmission system for package tracking as recited in claim 1, wherein the at least one communication is a set of instructions.

5. The integrated data collection and transmission system for package tracking as recited in claim 1, wherein the one of the infrared communications port and micro-radio between two devices of the integrated data collection and transmission system when the two devices are within one of a predetermined operating distance and orientation.

6. The integrated data collection and transmission system for package tracking as recited in claim 1, wherein the at least one peripheral device comprises a printer and wherein the preselected operation includes printing one of a label containing package tracking information and a receipt.

7. The integrated data collection and transmission system for package tracking as recited in claim 1, wherein the at least one peripheral device comprises a data transfer device coupled to a customer PC and wherein the preselected operation comprises transmitting package tracking information from the customer PC to the data collection terminal via one of an infrared communications port and a micro-radio contained within the data transfer device.

8. The integrated data collection and transmission system for package tracking as recited in claim 1, wherein the at least one peripheral device comprises a storage facility having controlled access and wherein the preselected operation includes providing access to the storage facility.

9. The integrated data collection and transmission system for package tracking as recited in claim 1, wherein the at least one peripheral device comprises an admonishment device capable of advising a courier of the contents of a storage facility.

10. The integrated data collection and transmission system for package tracking as recited in claim 1, wherein the at least one peripheral device comprises a keyless entry device and wherein the preselected operation comprises opening a door of one of a package delivery vehicle and a package sorting facility.

11. The integrated data collection and transmission system for package tracking as recited in claim 1, wherein the intermediate data storage device comprises a vehicle mounted data terminal for receiving the collected and stored package tracking data from the data collection terminal and for forwarding the data to the central data collection facility and for receiving dispatch information.

12. The integrated data collection and transmission system for package tracking as recited in claim 1, wherein the intermediate data storage device comprises a portable data terminal for receiving the collected and stored package tracking data from the data collection terminal and for forwarding the data to the central data collection facility and for receiving dispatch information.

13. The integrated data collection and transmission system for package tracking as recited in claim 1, wherein the data collection terminal includes a battery supply and a system to determine the relative power capacity of the battery power supply and stored information representative of the battery power supply and wherein the data reception device recharges the battery power supply in response to the stored information representative of the battery power supply when the data collection terminal is placed in the data reception device.

14. The integrated data collection and transmission system for package tracking as recited in claim 1, wherein the intermediate data storage device comprises a conveyor device coupled to a conveyor belt, the conveyor device receiving information from the data collection terminal and transmitting the information to the central data collection facility.

15. The integrated data collection and transmission system for package tracking as recited in claim 1, wherein the intermediate data storage device comprises an interface device that receives information from the data collection terminal and transmits the data to the central data collection facility via a telephone line.

16. The integrated data collection and transmission system for package tracking as recited in claim 1, wherein the intermediate data storage device comprises a data transceiver device capable of bidirectional data transfer between a plurality of data collection terminals and the central data collection facility.

17. The integrated data collection and transmission system for package tracking as recited in claim 16, wherein the data transceiver device includes a recharger for recharging a battery of the data collection terminal.

18. The integrated data collection and transmission system for package tracking as recited in claim 16, wherein a memory of the data collection device is emptied upon transfer by the data transceiver device.

19. The integrated data collection and transmission system for package tracking as recited in claim 1, wherein the intermediate data storage device comprises a data collection device that is body wearable.

20. The integrated data collection and transmission system for package tracking as recited in claim 19, wherein the data storage device comprises:

a microradio, for receiving information into the data storage device;

a power supply, for supplying power to the data storage device;

an intermediate range radio, for transferring information from the data storage device; and a memory, for storing data in the data storage device.

21. The integrated data collection and transmission system for package tracking as recited in claim 19, wherein the data storage device transmits the collected and stored package tracking data to one of the central data collection facility and a second intermediate storage device.

22. The integrated data collection and transmission system for package tracking as recited in claim 1, wherein the data collection terminal is powered by a battery and includes a smart battery system capable of providing information about battery usage and power level to the informational display.

23. The integrated data collection and transmission system for package tracking as recited in claim 22, wherein the smart battery system shuts down the data collection terminal at a preselected power level.

24. The integrated data collection and transmission system for package tracking as recited in claim 22, wherein the smart battery system periodically determines the power consumed by the data collection terminal and controls at least one of the output or operation of the data collection terminal based on that determination.

25. The integrated data collection and transmission system for package tracking as recited in claim 24, wherein the smart battery system controls the manner in which the battery is recharged, based on the determination of power consumption.

26. The integrated data collection and transmission system for package tracking as recited in claim 1, wherein the data collection terminal further comprises:

an informational display, which displays information regarding data collection;
a central processing unit (CPU);
a memory, coupled to the CPU, for storing information relative to data collection;
means for inputting information relative to data collection to the data collection terminal; and
a power supply, coupled to the CPU, which supplies power to the data collection terminal.

27. The integrated data collection and transmission system for package tracking as recited in claim 26, wherein the means for inputting comprises a keyboard.

28. The integrated data collection and transmission system for package tracking as recited in claim 26, wherein the means for inputting information includes a bar code scanner.

29. The integrated data collection and transmission system for package tracking as recited in claim 26, wherein the means for inputting comprises a touch screen.

30. The integrated data collection and transmission system for package tracking as recited in claim 29, wherein the informational display is capable of receiving information from a stylus device.

31. The integrated data collection and transmission system for package tracking as recited in claim 26, wherein the data collection terminal contains stored data regarding package shipping and outputs the data to the touchscreen.

32. The integrated data collection and transmission system for package tracking as recited in claim 31, wherein the stored data comprises at least one of shipping costs, customer data, a common customer list, cash-only customers, international delivery information, dispatch information, courier input information, dangerous goods information, instructional information, performance feedback, news updates, a service reference guide, maps, zip code information, and address verification.

33. The integrated data collection and transmission system for package tracking as recited in claim 1, wherein the at least one peripheral device comprises an admonishment device for advising a customer whether a package pickup has been made.

34. The integrated data collection and transmission system for package tracking as recited in claim 21, wherein the storage facility is a drop box with a lock that is opened and closed in response to a communication from the data collection terminal.

35. The integrated data collection and transmission system for package tracking as recited in claim 33, wherein the admonishment device is coupled to a storage facility and the at least one communication activates the admonishment device to advise the customer whether package pickup has been made.

36. The integrated data collection and transmission system for package tracking as recited in claim 35, wherein the admonishment device comprises a rotatable wheel and associated electronics.

37. The integrated data collection and transmission system for package tracking as recited in claim 35, wherein the storage facility is a drop box.

38. The integrated data collection and transmission system for package tracking as recited in claim 35, wherein the admonishment device comprises an informational display.

39. The integrated data collection and transmission system for package tracking as recited in claim 38, wherein the informational display comprises one of an LCD, a series of LEDs, and a vacuum florescent display.

40. A method of tracking package data using an integrated data collection and transmission system, the method comprising the steps of:

using a bar code scanner to collect and store package tracking data;
transmitting a communication to a peripheral device via one of an infrared communications and a micro-radio link, the peripheral device performing a preselected operation related to package tracking based on the command;
transmitting the collected and stored package tracking data to an intermediate data storage device via one of the infrared communications and micro-radio links;
transmitting the collected and stored package tracking data to a central data facility;
maintaining an accessible package tracking database based on the collected and stored package tracking data.

41. An integrated data collection and transmission system having one of a common infrared communications link and a microradio link between selected ones of its components comprising:

one or more bar code scanning devices, each having a memory, an informational display, a CPU, a keyboard for inputting information to the device, a power supply, and one of an infrared communications port and a microradio for communicating with selected other components of the system including other of the bar code scanners;
one or more intermediate data storage and processing devices provided with one of an infrared communications port and a microradio for receiving information from one of the one or more bar code scanning devices and for communicating with the selected other components of the system;
a printer with one of an infrared communications port and a microradio capable of receiving a print command from one of the one or more bar code scanning devices; and
a central computer with means for accepting, storing and transmitting data to and between the one or more intermediate data storage and processing devices.

42. The system according to claim 41, further comprising one or more central stations at sites for storage, sorting, loading and conveying articles in transit, said one or more control stations having one of an infrared communications port and a microradio for communicating with selected other components of the system.

43. The system according to claim 41, further comprising one or more storage facilities having controlled access activated by signals communicated via the one of the infrared communications link and microradio link.

* * * * *

UNITED STATES PATENT AND TRADEMARK OFFICE
CERTIFICATE OF CORRECTION

PATENT NO.   : 6,094,642
DATED        : July 25, 2000
INVENTOR(S)  : Winn Stephenson et al.

Page 1 of 1

It is certified that error appears in the above-identified patent and that said Letters Patent is hereby corrected as shown below:

\*\*  <u>Claim 3, column 12,</u>
Line 22, "at let" should read -- at least --.

\*   <u>Claim 34, column 15,</u>
Line 64, "claim 21" should read -- claim 33 --.

\*   This error is the fault of the Patent and Trademark Office.
\*\*  This error is the fault of the Applicants Signed and Sealed this Second Day of October, 2001

Attest:

*Nicholas P. Godici*

NICHOLAS P. GODICI
*Attesting Officer*   Acting Director of the United States Patent and Trademark Office